United States Patent
GV et al.

(10) Patent No.: US 10,193,744 B1
(45) Date of Patent: Jan. 29, 2019

(54) MASS RESTORATION OF ENTERPRISE BUSINESS SERVICES FOLLOWING SERVICE DISRUPTION

(71) Applicant: INTUIT INC., Mountain View, CA (US)

(72) Inventors: Aravind GV, Bangalore (IN); Debajit Kataki, Bangalore (IN); Chandra Sekhar Sara, Menlo Park, CA (US); Balajee Sundaram, Bangalore (IN); S. Vijay Anand, Bangalore (IN)

(73) Assignee: INTUIT INC., Mountain View, CA (US)

( * ) Notice: Subject to any disclaimer, the term of this patent is extended or adjusted under 35 U.S.C. 154(b) by 301 days.

(21) Appl. No.: 15/177,902

(22) Filed: Jun. 9, 2016

(51) Int. Cl.
  *G06F 9/44* (2018.01)
  *H04L 12/24* (2006.01)
  *H04L 29/06* (2006.01)
  *H04L 29/08* (2006.01)

(52) U.S. Cl.
  CPC .......... *H04L 41/0672* (2013.01); *H04L 41/12* (2013.01); *H04L 63/04* (2013.01); *H04L 67/10* (2013.01)

(58) Field of Classification Search
  CPC ... H04L 41/22; H04L 69/329; H04L 41/5003; H04L 41/5022; H04M 7/1225
  See application file for complete search history.

(56) References Cited

U.S. PATENT DOCUMENTS

| | | | |
|---|---|---|---|
| 6,883,170 B1* | 4/2005 | Garcia | G06F 11/1438 707/999.001 |
| 2010/0223609 A1* | 9/2010 | DeHaan | H04L 67/16 717/177 |
| 2013/0042139 A1* | 2/2013 | Bhalerao | G06F 11/0709 714/2 |
| 2017/0060707 A1* | 3/2017 | Harper | G06F 11/2033 |

* cited by examiner

*Primary Examiner* — Chirag R Patel
(74) *Attorney, Agent, or Firm* — Patterson + Sheridan, LLP (57) ABSTRACT

Techniques are disclosed for restoring application services following a service disruption to a computer network. A faster service restoration (FSR) engine identifies one or more services hosting at least one of the services. The FSR engine identifies dependencies between the service and other application services. The FSR engine generates a run list comprising one or more healing scripts for restoring the services in one or more successive phases. Each successive phase is determined based on the dependencies. Each healing script is associated with one of the services and includes instructions for starting, stopping, and restarting the service. The run list is invoked on each of the servers to restore the application.

20 Claims, 8 Drawing Sheets

MASS RESTORATION OF ENTERPRISE BUSINESS SERVICES FOLLOWING SERVICE DISRUPTION

BACKGROUND

Field

Embodiments presented herein generally relate to computer systems and software. More specifically, embodiments presented herein relate to restoring application services in a network after a mass outage has occurred.

Description of the Related Art

Enterprise networks generally include a variety of systems, such as storage systems and application servers. Further, applications running on these systems can include legacy applications executing in data center systems controlled by the enterprise as well as cloud-based services executing on virtual machines. Consequently, given such a complex infrastructure, many interdependencies may exist between the applications and services. For example, an application service that provides payment processing functions for the enterprise may depend on a particular storage service executing in the cloud.

Occasionally, an enterprise network may experience outages that result in disruption to the application services. For example, a distributed switch in the network may fail and cause systems to go offline. As another example, one of the data centers supporting the enterprise network can completely lose power. Typically, when an outage occurs, system engineers must identify the systems that need to be restarted. In addition, because of complex dependencies shared between application services, the system engineers must also strategize which systems and services to restore prior (or after) other systems and services. And this may require multiple attempts, as some dependencies may be overlooked. As a result, this approach restoring an enterprise network after a mass outage is time-consuming process that results in lost productivity and resources.

SUMMARY

One embodiment presented herein discloses a method for restoring a plurality of services of an application in a computer network following a service disruption. This method generally includes identifying, via a processor, one or more servers hosting at least one of the services. This method also includes identifying at least a first dependency between the at least one of the services and another one of the plurality of services. A run list comprising one or more scripts for restoring the plurality of services in one or more successive phases is generated. Each successive phase is determined based on the at least a first dependency. Each script is associated with one of the plurality of services and comprises instructions for at least one of starting, stopping, and restarting the service. The run list is invoked on each of the one or more servers.

Another embodiment discloses a computer-readable storage medium storing instructions, which, when executed on a processor, performs an operation for restoring a plurality of services of an application in a computer network following a service disruption. The operation itself generally includes identifying, via the processor, one or more servers hosting at least one of the services. The operation also includes identifying at least a first dependency between the at least one of the services and another one of the plurality of services. A run list comprising one or more scripts for restoring the plurality of services in one or more successive phases is generated. Each successive phase is determined based on the at least a first dependency. Each script is associated with one of the plurality of services and comprises instructions for at least one of starting, stopping, and restarting the service. The run list is invoked on each of the one or more servers.

Yet another embodiment discloses a system having a processor and a memory storing a program, which, when executed on the processor, performs an operation for restoring a plurality of services of an application in a computer network following a service disruption. The operation itself generally includes identifying one or more servers hosting at least one of the services. The operation also includes identifying at least a first dependency between the at least one of the services and another one of the plurality of services. A run list comprising one or more scripts for restoring the plurality of services in one or more successive phases is generated. Each successive phase is determined based on the at least a first dependency. Each script is associated with one of the plurality of services and comprises instructions for at least one of starting, stopping, and restarting the service. The run list is invoked on each of the one or more servers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Occasionally, an enterprise application stack may experience large service disruptions. For example, a data center that serves the application stack may undergo a power outage, or a network switch connecting servers at different geolocations may go offline. Similarly storage devices can go offline. Further, traditional methods of restoring application services in the enterprise network after such a disruption may consume a significant amount of time and resources due to various factors, such as interdependencies between a variety of services in the network, from legacy application services to cloud-based services. In addition, some applications affected by a mass outage may continue to run in some cases, e.g., where some services of a given application may be available to a certain subset of users in a geographic location while unavailable to others. Traditional methods often require that the entire application (or in some cases, a stack of services running on different systems) be restarted, thus disrupting services for users in areas not affected by the outage.

Embodiments presented herein disclose techniques for restoring application services after a mass outage. One such embodiment includes a faster service restoration (FSR) engine that restores services within a relatively minimal amount of time following the mass outage. To do so, the FSR engine profiles each service, e.g., maintaining which nodes in the enterprise network execute the service, a topology of node clusters where the service is provided, and "healing scripts" (also referred to herein as "recipes") used to automatically restore the service after initiating a restoration following the mass outage.

In one embodiment, the FSR engine identifies upstream and downstream dependencies associated with the application, i.e., services that need to be restored prior (or after) to the restoration of a given application service. Doing so allows the FSR engine to optimally control a sequence in which services are restored. Further, the FSR engine dynamically generates, based on the sequence, a run list based on a distinct service profile, which is then used to apply the healing scripts to restore a given service and its dependencies. The FSR engine executes the healing scripts according to the run list for that service. Further still, the FSR engine can restore multiple instances of supporting applications and services in parallel, allowing the FSR engine to more quickly complete restoration of the enterprise application. Because the FSR engine executes the healing scripts on target servers to restore the application services, a thick client (or agent) is unnecessary.

For example, assume that, as a result of a mass outage, application A (e.g., a database application) goes down and needs to be restarted. The FSR engine determines, based on a service profile associated with application A, a number of servers that hosts application A, and corresponding healing scripts for restoring application A. The FSR engine also identifies any upstream and downstream dependencies associated with application A. For instance, the FSR engine may determine that application B (e.g., an application service that relies on the database application A) needs to be stopped prior to application A being restored and restarted after application A is restored. The FSR engine dynamically generates a run list for restoring application A, which may specify restoring one or more services prior to (or after) application A.

Embodiments disclosed herein identify sequences to restore sets of services based on whatever interdependencies exist between the services and further, executing healing scripts according to the identified sequences to restore the services. Advantageously, such techniques eliminate the need for trial-and-error experimentation involved with restoring one or more services after an outage. In addition, the FSR engine may determine which services can be restored in parallel based on the identified dependencies. For example, as will be further described below, the FSR engine may determine that application services having no dependencies may be restored in parallel threads. As a result, the amount of time required to restore services in the enterprise network is reduced.

Figure 1:
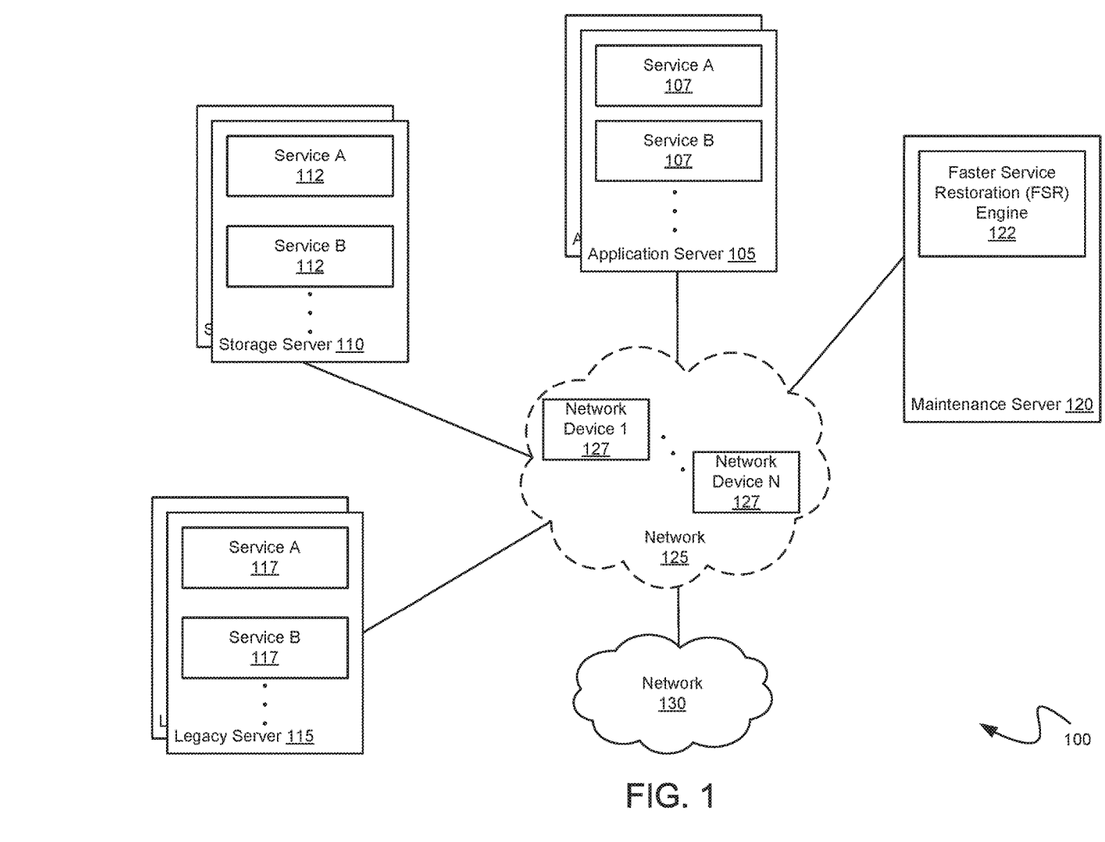
FIG. 1 illustrates an example computing environment, according to one embodiment.

FIG. 1 illustrates an example computing environment 100, according to one embodiment. As shown, computing environment 100 includes a number of application servers 105, storage servers 110, and legacy servers 115. Computing environment 100 also includes a maintenance server 120. Further, the servers 105, 110, 115, and 120 are interconnected with one another via a network 125, which comprises a number of network devices 1-N 127 (e.g., switches, routers, and the like). The network 125 itself may be connected with a network 130. In one embodiment, the network 130 represents the Internet.

In one embodiment, computing environment 100 represents an enterprise network that provides a diverse group of application services to users. For instance, an application server 105 includes services 107 (A, B, and so on). In the example computing environment 100, the services 107 include payment processing services, fraud detection applications, web portals, and the like. Similarly, a storage server 110 includes services 112 (A, B, and so on) that can include database systems, etc. Further, legacy servers 115 represent older systems in the enterprise network that are still being used. A given legacy server 115 may host services 117 (A, B, and so on).

In one embodiment, a given application server 105 (and similarly a given storage server 110 or legacy server 115) may be a physical computing system or a virtual computing instance executing in the cloud. Further still, the services 107, 112, and 117 may execute under a variety of server applications (e.g., Apache Tomcat, Wildfly, etc.).

Further, the servers 105, 110, and 115 can be hosted in different locations as needed to efficiently provide the services to various groups of users. In addition, any combination of the servers 105, 110, and 115 can be configured as a node cluster within the enterprise network (where the nodes in the clusters are the servers 105, 110, and 115). For instance, an administrator may configure cluster topologies and the services executing in each cluster. As a result, different clusters may serve different locations as well as provide distinct sets of services to a group of users.

As stated, the enterprise network may experience outages every once in a while. During such outages, one or more of the services (or even servers or node clusters) may go offline or become otherwise unavailable. For example, one of the network devices 127 (e.g., a distributed network switch) may fail, which can result in one or more of the servers 105, 110, and 115 going offline. As another example, a data center that houses a number of the servers 105, 110, and 115 may experience a power outage for a period of time. In either case, once the network devices and servers are back online, the services executing on those servers may need to be restored. Further, to do so, interdependencies between various services must be taken into account prior to restoring the services. For example, a payment processing application that needs to be restarted may require that a tokenization or a database server application be restarted beforehand. That is, simply restarting the payment processing application without restarting the tokenization or database server application may result in errors subsequently occurring in the payment processing application.

In one embodiment, the maintenance server 120 includes a faster service restoration (FSR) engine 122 that is provided with permissions to access servers running in the enterprise network. The FSR engine 122 provides a variety of restoration modes, such as an automatic restoration mode (where the FSR engine 122 detects application services going offline and automatically restores the service) and a manual mode. Further, the FSR engine 122 also provides a mass restoration mode, where, In particular, the FSR engine 122 restores services that have gone offline following a large service disruption in the enterprise network. An administrator may initiate the mass restoration mode, e.g., via a user interface for the FSR engine 122, after servers and/or network devices come back online after the disruption.

As described below, the FSR engine 122 maintains profiles associated with each service which includes information about servers executing the service, servers associated with particular clusters, upstream and downstream dependencies associated with each service, and healing scripts ("recipes") used to bring a service back online. The FSR engine 122 may generate a dynamic run list based on the service profiles that the FSR engine 122 can send to a given server to run and restore services.

Figure 2:
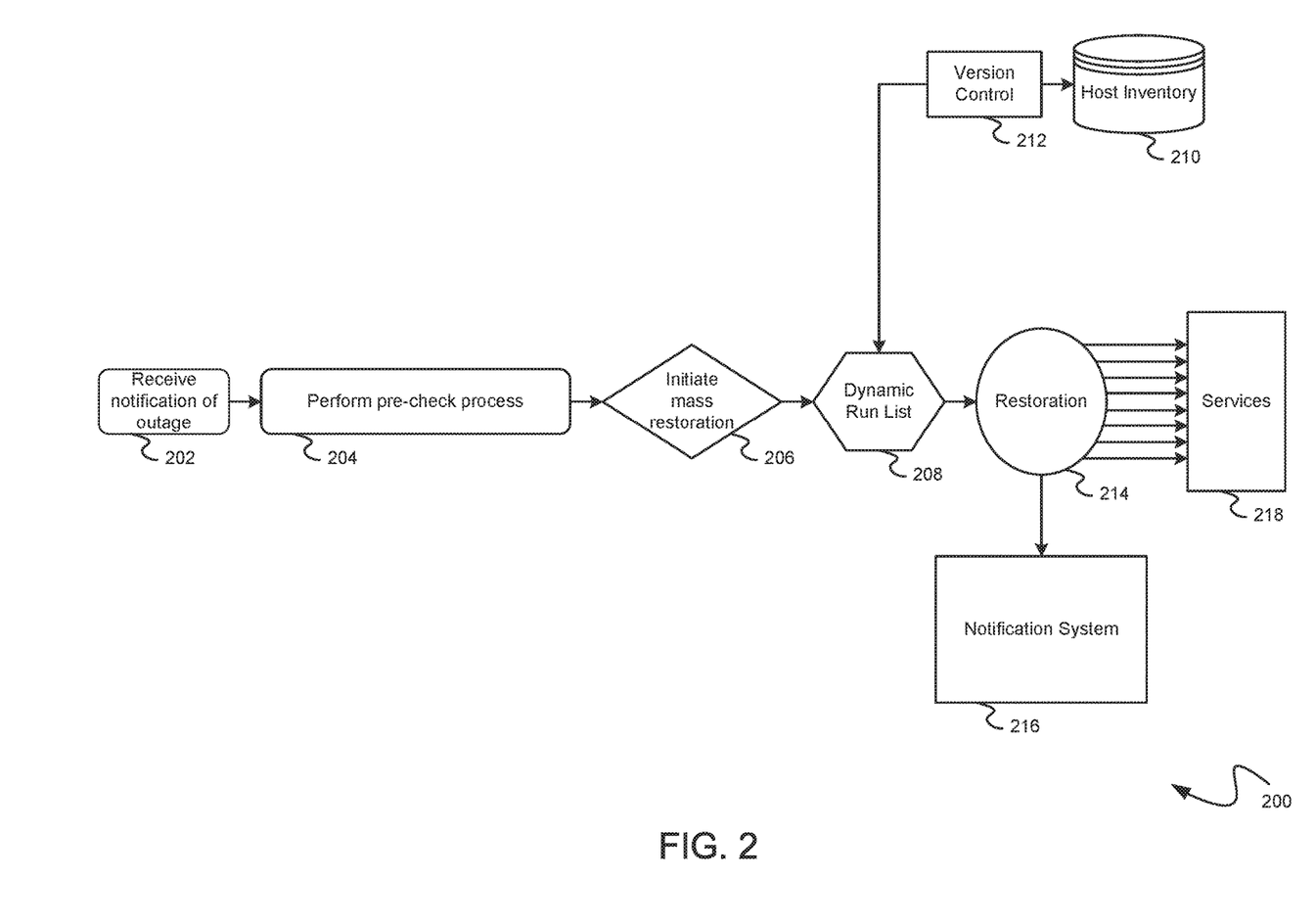
FIG. 2 illustrates an example workflow of a faster service restoration (FSR) architecture, according to one embodiment.

FIG. 2 illustrates an example workflow 200 of the FSR engine 122 after a mass outage in the enterprise network, according to one embodiment. In particular, the workflow 200 describes restoring application services (e.g., the services 107, 112, and 117) following an outage after the downed servers or network devices are brought back online.

At 202, the FSR engine 122 receives a notification of the outage. For example, an administrator may indicate to the FSR engine 122 (e.g., via a user interface that provides the administrator access to the FSR engine 122) that the enterprise network experienced a mass outage. The indication triggers the FSR engine 122 to begin the restoration process.

At 204, the FSR engine 122 performs a pre-check process to confirm that restoration of services is needed. Such a pre-check process ensures that one or more services are down prior to initiating mass restoration of the enterprise network services. To do so, the FSR engine 122 may perform status checks of the servers in the network (e.g., by pinging the servers), checking whether disks are mounted to each server, etc.

At 206, once the FSR engine 122 determines that services need to be restored, the FSR engine 122 initiates the mass restoration process. To do so, the FSR engine 122 generates a distinct dynamic run list to restore each unavailable service. For instance, to do so, the FSR engine 122 may identify any upstream or downstream services associated with the application, what servers may be hosting such dependencies, and scripts used to stop, start, and restart a given service and its dependencies. Once identified, the FSR engine 122 may then determine successive phases for carrying out the restoration in the dynamic run list. For instance, the FSR engine 122 may assign, in the run list, application services having no dependencies that need to be started as part of the restoration to a first phase. In doing so, the FSR engine 122 associates host systems executing those services with that first phase and includes the corresponding healing scripts for restoring the services on the host in parallel with one another. In addition, the FSR engine 122 may then assign application services having dependencies on the services associated with the previous phase to a subsequent phase. In this case, the FSR engine 122 associates the hosts executing those services with that phase and includes the corresponding healing scripts for restoring those services in parallel. The FSR engine 122 may continue this process until the generation of the dynamic run list is complete.

In one embodiment, the dynamic run list specifies one or more servers associated with the service and instructions for the servers to perform to bring the service back online (e.g., using scripts for stopping and restarting the services, directives as to whether to perform restoration serially with other servers or in parallel, etc.). For instance, the instructions specify a sequence at which particular services should be stopped, restarted, and/or restored relative to one another. As further described below, the FSR engine 122 may structure the dynamic run list based on upstream and downstream dependencies associated with a given service. At 210, a host inventory 210 may provide the FSR engine 122 with profiles for each service that describe servers (and clusters) that host a given service. The profiles may also specify dependencies that a given service has with other services that are predefined and maintained in a database. At 212, the FSR engine 122 may evaluate a version control repository to ensure that an appropriate profile is used in the mass restoration process. The version control repository maintains scripts, node lists, and cluster topologies that are associated with a given service profile.

At 214, the FSR engine 122 performs the restoration by pushing the run lists for each service to each corresponding server. In turn, the servers invoke the run list and performs the instructions specified to restore the services (at 218). The servers may carry out the healing scripts to restore the target services and return a result to the FSR engine 122. At 216, if a server is unsuccessful in restoring a given service, the FSR engine 122 may generate and send a report to a notification system. The notification system may then inform the user of any other rare case failure scenario related to the restoration of any of these services.

Figure 3:
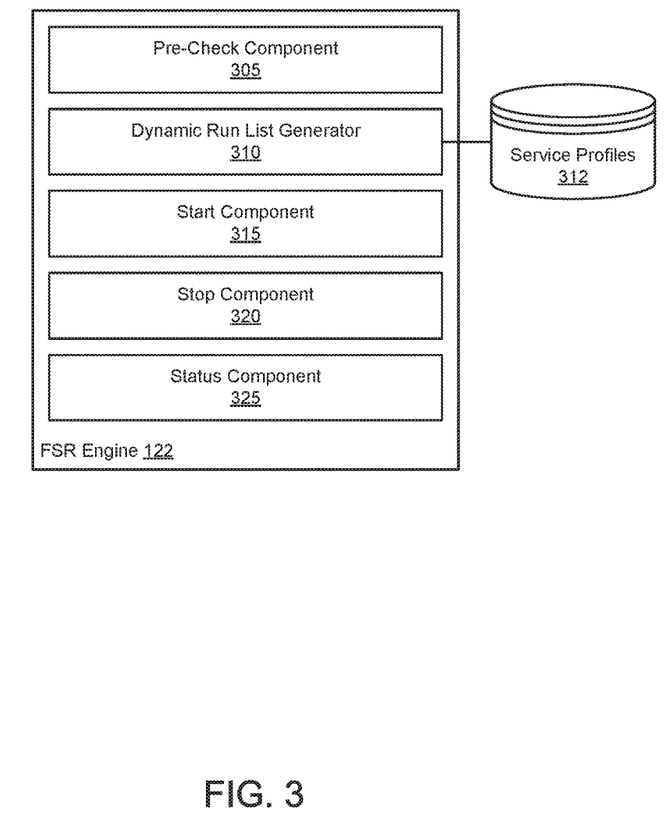
FIG. 3 further illustrates the FSR engine described relative to FIG. 1, according to one embodiment.

FIG. 3 further illustrates the FSR engine 122, according to one embodiment. As shown, the FSR engine 122 includes a pre-check component 305, a dynamic run list generator 310, one or more service profiles 312, a start component 315, a stop component 320, and a status component 325.

In one embodiment, the pre-check component 305 receives an indication to perform a mass restoration of the enterprise network (e.g., typically following a large service disruption). Once received, the pre-check component 305 scans a list of servers available in the host inventory 210 to determine whether the servers are in working state (e.g., whether a server is responding to ping requests, whether disks connected to a server are mounted according to specification, SSH logins to the server are working properly, etc.). For example, the pre-check component 305 may attempt to connect to each service, e.g., by establishing an SSH connection with a server and checking the status of a hosted service using a script. If the pre-check component 305 determines that any of the servers are not working running properly, the pre-check component 305 may abort the mass restoration process.

Further, the checks performed by the pre-check component 305 also identify the services that are offline as a result of the large service disruption. If the pre-check component 305 identifies one or more services that are down, the pre-check component 305 may send information regarding offline services to the dynamic run list generator 310. In one embodiment, the dynamic run list generator 310 uses services profiles 312 to create a dynamic run list of instructions that directs a server to perform to restore an application service.

In one embodiment, the service profiles 312 are automatically generated during a given mass restoration process. Further, each service profile 312 specifies a set of host servers in the network that execute a given service. The service profile 312 may also identify a cluster topology of the host servers executing that service. Generally, the cluster topology identifies a partition of host servers executing a particular service. Such information allows the FSR engine 122 to determine services executing on different servers so that, when restoring the service on a given server, the service can continue to execute on other services (if currently executing). For example, host servers A, B, and C may host a given application service. These servers may represent a cluster. Further still, the service profile 312 may include one or more healing scripts (or "recipes") for restoring the service. Each recipe may consolidate separate scripts executed to restore that service. For example, a healing script may first include steps for creating a temporary directory for storing restoration data, stopping all processes associated with a service, restarting those processes, and then removing the temporary directory.

In one embodiment, the dynamic run list generator 310 identifies, based on a service profile 312 for a given service, any upstream or downstream dependencies associated with the service. For instance, a service A may depend on web or storage services that need to be running for the service to properly function. In addition, other services may require that service A be running for those services to properly function. As stated, the dependencies may be previously defined in the service profile 312 and also maintained in a data store of the enterprise network.

Once the dynamic run list generator 310 identifies hosts running application services and service dependencies, the dynamic run list generator 310 builds the dynamic run list specifying a sequence of phases and scripts at which services should be stopped and/or started to restore the application on the identified hosts. As noted, each phase corresponds to a set of services that can be restored in parallel at that phase based on the service dependencies. The resulting dynamic run list provides instructions to a server for applying a healing script to a service hosted in the server. To build the run list, the dynamic run list generator 310 may include scripts to launch services that have no downstream dependencies (e.g., a group of database and web services used by an application) in parallel. The dynamic run list generator 310 may then populate a subsequent portion of the run list with scripts to start applications that depend on the service started in the previous portion, in parallel. Once the run list is generated, the dynamic run list generator 310 may send the run list to target servers (identified by the service profile) for execution (in parallel and/or serially, as specified).

In one embodiment, the start component 315, stop component 320, and status component 325 are modules of the FSR engine 122 used to remotely carry out the instructions of the dynamic run list. For example, the start component 315 may be used to restart a service that is currently offline. In some cases, prior to restarting a given service, other services may need to be shut down to avoid conflicts or other interruptions to the restart. In such a case, the FSR engine may use the stop component 320 to shut down those services. The dynamic run list may specify the order at which the components should start and stop services during the restoration. The status component 325 monitors the liveliness of the servers in the enterprise network and the status of the application services.

Figure 4:
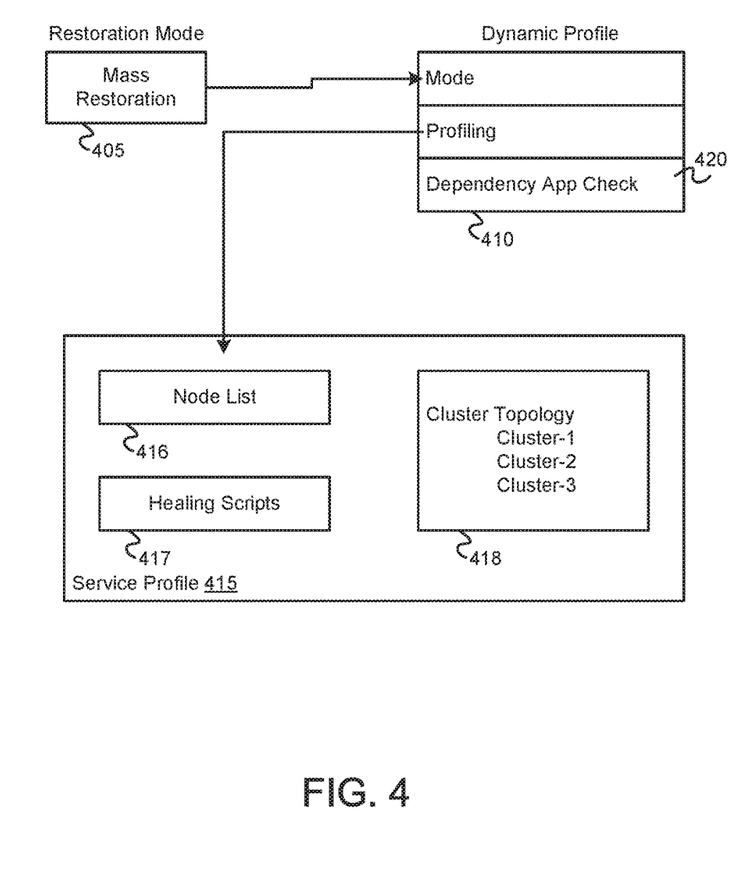
FIG. 4 illustrates an example workflow of the dynamic runlist generator described relative to FIG. 3, according to one embodiment.

FIG. 4 illustrates an example flow of the dynamic run list generator 310, according to one embodiment. The dynamic run list generator 310 dynamically analyzes a service to assess and identify an appropriate set of healing scripts to apply to a given set of nodes for restoring a particular service. At 405, the dynamic run list generator 310 receives an indication of a restoration mode. As stated, the FSR engine 122 may perform a variety of restoration modes, such as an auto restoration mode, a manual mode, or a mass restoration mode. Illustratively, the FSR engine 122 receives an indication of a mass restoration mode used to restore services following a large service disruption.

Illustratively, at 410, the dynamic run list generator 310 evaluates the restoration mode and builds a service profile 415 that includes data relating to a particular service that is unavailable as a result of the outage. At 416, the dynamic run list generator 310 identifies a node list based on servers in the enterprise network that execute the service. Further, at 417, the dynamic run list generator 310 identifies, based on the node list, one or more healing scripts for restoring the service on those servers. For example, the dynamic run list generator 310 may determine, based on the type of server application used (e.g., Apache Tomcat, WildFly, etc.) and select an appropriate script for restoring the underlying service.

In one embodiment, at 418, the dynamic run list generator 310 evaluates a cluster topology of the enterprise network. Doing so allows the dynamic run list generator 310 to build the dynamic run list to stagger the restoration, based on the clustering, such that some services of a given application continue to run while other servers running the same services of the application are being restored. For example, the dynamic run list generator 310 may assign each cluster within a phase, where the FSR engine 122 restores the services in a specified portion of a cluster during one phase while maintaining a minimum availability of services during that phase. Doing so allows the users currently accessing the application on a server unaffected by the disruption to continue accessing the application while the FSR engine 122 restores the application on other servers.

At 420, the dynamic run list generator 310 identifies a chain of upstream and downstream dependencies associated with the service. For example, the dynamic run list generator 310 may evaluate pre-defined mappings or configurations of the service to do so. The dynamic run list generator 310 may structure the dynamic run list such that services having no dependencies are restored in parallel to the restoration of other services. As stated, the dynamic run list generator 310 may separate the restoration of application into phases. In one embodiment, the phases may be structured based on dependency. The dynamic run list generator 310 first identifies application services that have no dependencies. Further, the dynamic run list generator 310 then identifies which servers host those application services. The dynamic run list generator 310 may assign those services to a first phase. The dynamic run list generator 310 may then assign services that depend on the availability of those independent services to be restored in a subsequent phase. Advantageously, separating the restoration into phases also allows the dynamic run list generator 310 to identify which services can be restored in parallel to one another, resulting in faster restoration of the application and more efficient performance of the underlying systems during the restoration. For example, the dynamic run list generator 310 may specify, in the generated run list, certain services within a phase to be restored in parallel because these services have no dependencies (or are dependent on services that have already been restored in a previous phase). The dynamic run list generator 310 includes, in the dynamic run list, the scripts used to start those services in parallel.

The dynamic run list generator 310 creates the dynamic run list based on identified servers executing a given service, one or more healing scripts to execute based on the identified servers, and a dependency chain associated with the service. As stated, the FSR engine 122 may push the dynamic run list to each server running the service. Thereafter, the FSR engine 122 may connect to each server and remotely carry out the instructions in the dynamic run list to restore the service in the enterprise network.

Figure 5:
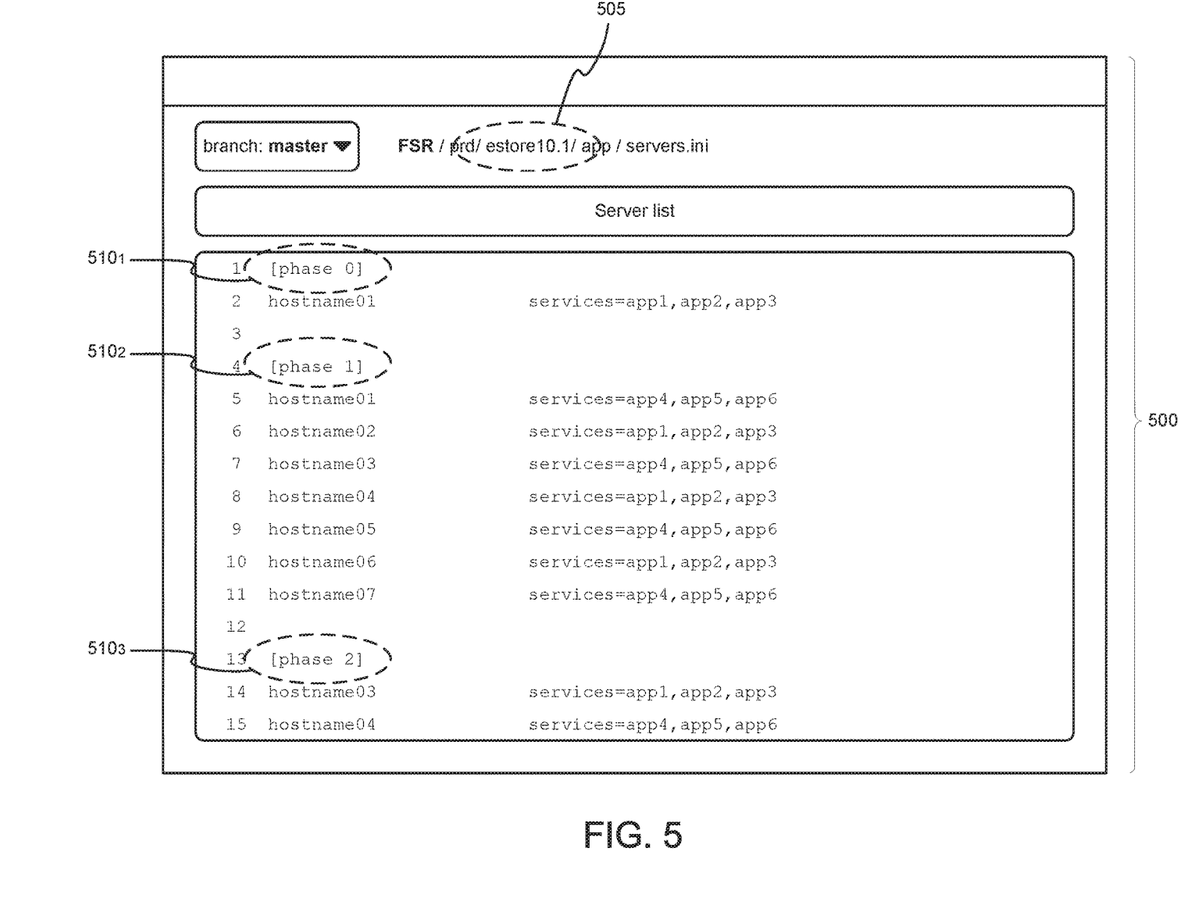
FIG. 5 further illustrates an example service profile used in mass restoration of application services in a network, according to one embodiment.

FIG. 5 further illustrates an example service profile used in mass restoration of application services in a network, according to one embodiment. In particular, FIG. 5 depicts a web interface 500 that presents a listing of application servers executing a given application 505 called "estore10.1". Illustratively, the left-hand column of the interface 500 presents a listing of phases at which the FSR engine 122 restores services. As shown, the interface 500 presents a [phase 0] 510$_1$, [phase 1] 510$_2$, and a [phase 2] 510$_3$, which, under each phase, a listing of corresponding servers is provided. For instance, [phase 0] 510$_1$ lists one server, whereas the [phase 0] 510$_1$ lists seven servers.

In one embodiment, the phases are defined successively based on service dependencies. For example, [phase 0] 510$_1$ represents a server hosting services that can be restored without having to take down other services due to no dependencies being associated with those services. For instance, the services app1, app2, and app3 executed on hostname01 in [phase 0] 510$_1$ might be storage-based services that other services in subsequent phases (e.g., in [phase 1] 510$_2$ and [phase 2] 510$_3$) may rely upon. As stated, structuring services to be restored based on dependencies allows the dynamic run list generator 310 to identify which services can be restored in parallel so as to reduce the amount of time taken to restore a given application within the enterprise network. For example, the application services app1, app2, app3 assigned to [phase 0] 510$_1$ may be restored in parallel threads during the actual restoration of the services. Doing so may significantly reduce the time required to restore the services, compared to restoring app1, app2, and app 3 in a particular sequence.

Illustratively, the right-hand column lists the application services executed by the corresponding server during a given phase. For example, server hostname01 in [phase 0] 510$_1$ executes services app1, app2, and app3. In [phase 1] 510$_2$, the same server hostname01 executes services app4, app5, and app6. Other servers in [phase 1] 510$_2$ may also execute services app4, app5, and app6 (e.g., server hostname03, hostname05, and hostname07). These servers may represent a given cluster, for the purposes of maintaining availability the associated services during restoration. For example, the FSR engine 122 may stagger the restoration such that a specified portion of the server cluster continues to execute the services while the other portion is being restored. Consequently, for example, if server hostname01 is down, the services app4, app5, and app3 may still be accessible on [phase 1] 510$_2$.

In one embodiment, the dynamic run list generator 310 may build a dynamic run list such that the FSR engine 122 performs a rolling restoration of the application services. To do so, the dynamic run list generator 310 identifies points (e.g., by cluster) in the cluster topology of servers by which to stagger service restoration. The dynamic run list generator 310 may stagger restoration such that, at any given time, a portion of the application services remain accessible by users while another portion is being restored. For example, the resulting dynamic run list may organize the restoration by successive phases. And in each phase, the dynamic run list may identify clusters within the phase and ensure that services continue to run in that cluster on a portion of the servers during the restoration of those services on the other portion (effectively rolling the restoration process). In practice, maintaining two-thirds of availability has proven to be effective.

Figure 6:
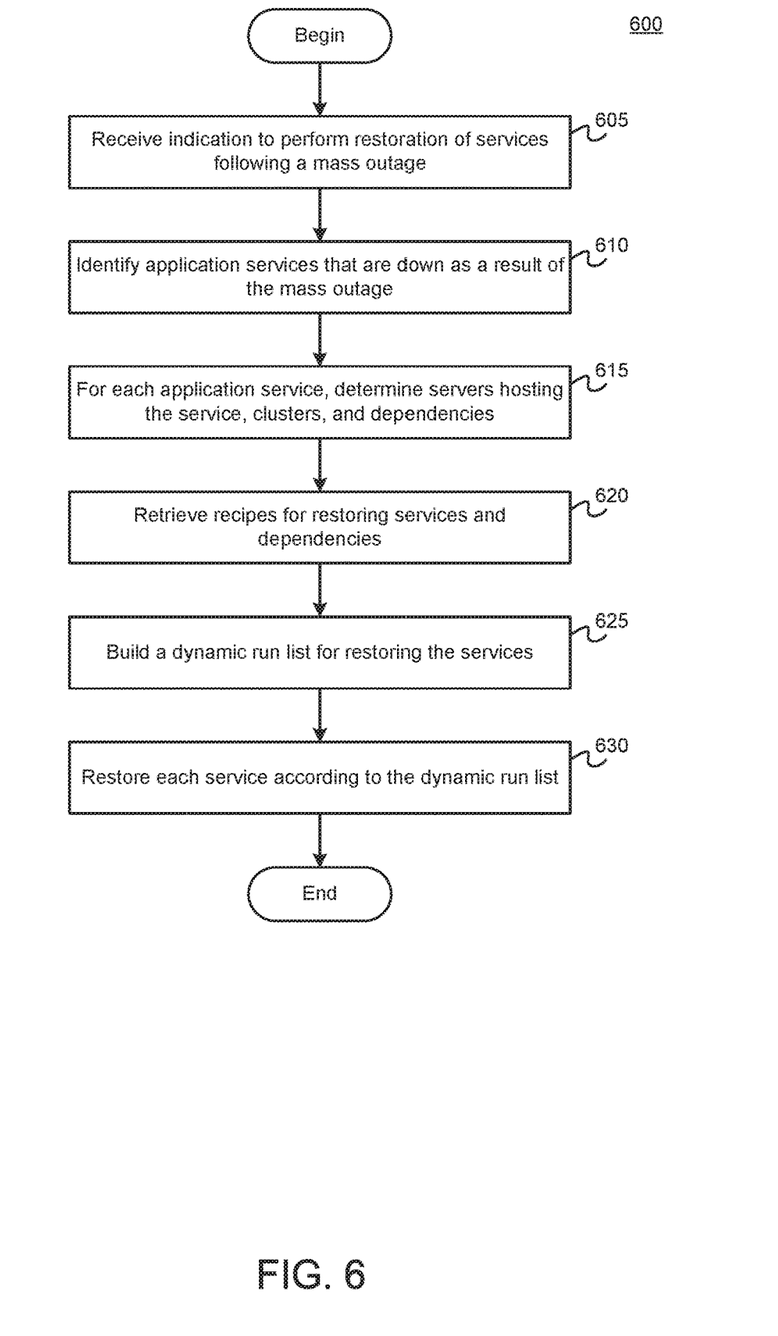
FIG. 6 illustrates a method for restoring application services in a computer network after a large service disruption, according to one embodiment.

FIG. 6 illustrates a method 600 for restoring application services in a computer network (e.g., an enterprise network) following a service disruption, according to one embodiment. As shown, method 600 begins at step 605, where the pre-check component 305 receives an indication to perform a mass restoration of services. For example, following the service disruption (and after systems and network devices are restored), an administrator may activate, through a user interface for the FSR engine 122, a mass restoration process for the enterprise network, sending the indication to the pre-check component 305. The pre-check component 305 may determine whether any servers or services in the network are offline. If the pre-check component 305 determines that all services are currently available, the pre-check component 305 may abort the mass restoration from occurring and report an error to the administrator. Otherwise, at step 610, the pre-check component 305 identifies services that are down as a result of the service disruption.

At step 615, for each application service, the dynamic run list generator 310 profiles the service by identifying servers in the enterprise network hosting the service as well as a cluster topology. In addition, the dynamic run list generator 310 identifies a chain of upstream and downstream dependencies for the application service. At step 620, the dynamic run list generator 310 determines recipes associated with the application service.

At step 625, the dynamic run list generator 310 builds a dynamic run list used to restore the services. As stated, the dynamic run list is a dynamically generated set of instructions built based on the servers, recipes, and dependencies associated with the application services. The instructions may specify a sequence at which services are restored, as well as whether to perform restoration on a given service (or dependency) in parallel or serially with another service.

At step 630, the FSR engine 122 restores each service according to the instructions of the dynamic run list. To do so, the FSR engine 122 may push the dynamic run list to each of the identified services executing the service and associated dependencies. Thereafter, the FSR engine 122 may access the servers (e.g., using a secure connection, such as SSH) and execute the instructions. Advantageously, the FSR engine 122 is able to restore the services without the need of a thick client to execute on the servers.

Figure 7:
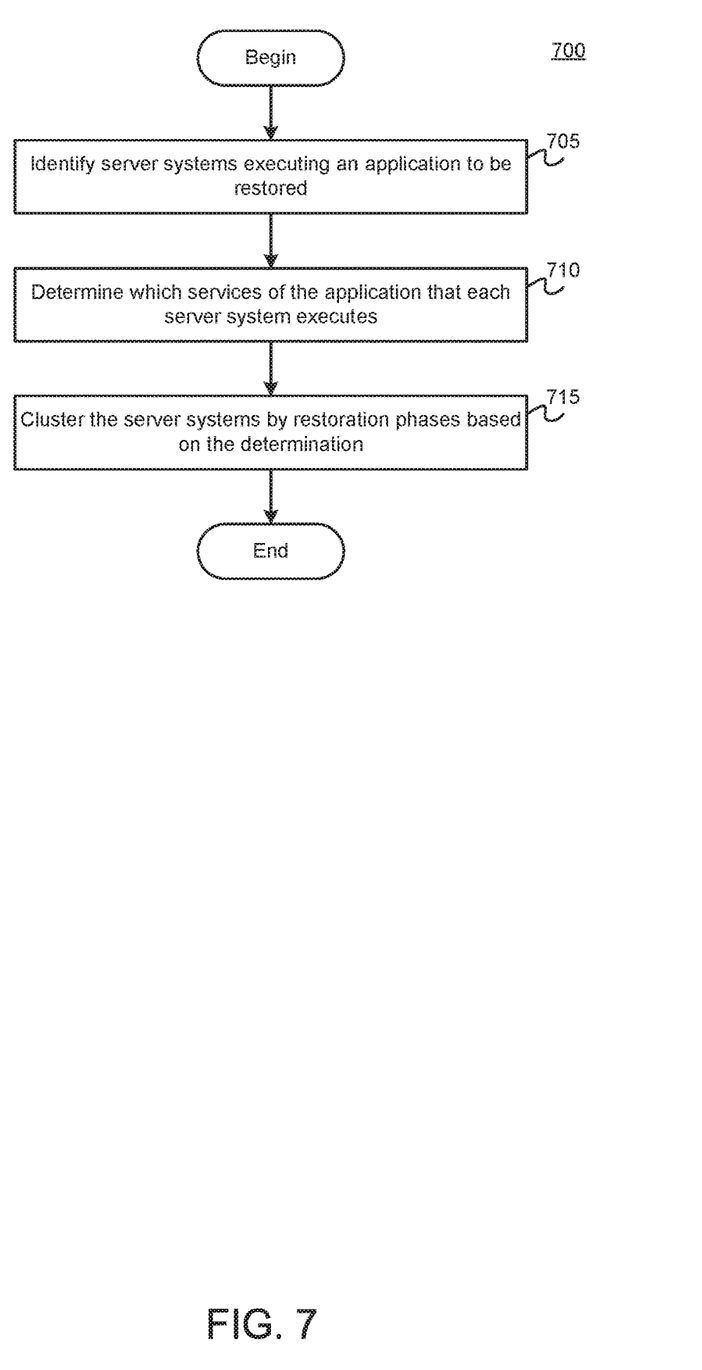
FIG. 7 illustrates a method for rolling restoration of application services in a computer network, according to one embodiment.

FIG. 7 illustrates a method 700 for rolling restoration of application services in a computer network, according to one embodiment. As stated, the FSR engine 122 may perform a rolling restoration of application services in the enterprise network such that a subset of the application services continue to run (if already accessible to users) while the FSR engine 122 is restoring the services on other servers. In one embodiment, the FSR engine 122 may perform the method 700 as part of building the dynamic run list.

As shown, the method 700 begins at step 705, where the dynamic run list generator 310 identifies server systems executing an application to be restored by the FSR engine 122. To do so, the dynamic run list generator 310 may evaluate a host inventory maintained by the FSR engine 122, which, as stated, describes a list of servers running a given service for an application.

At step 710, the dynamic run list generator 310 determines, based on the host inventory, which services of the application each server system executes. The dynamic run list generator 310 may evaluate a service profile listing the servers and associated application services. At step 715, the dynamic run list generator 310 clusters the server systems based on the determination. For example, as stated above, the dynamic run list generator 310 may organize the server list by phases based on service dependencies. Within those phases, some servers may execute a particular service. The dynamic run list generator 310 may identify those servers as a cluster executing that service. Clustering the services allows the dynamic run list generator 310 to identify points in the cluster to stagger restoration, i.e., roll the restoration process out to a specified portion of those servers so as to maintain service availability in the other portion of servers. When restoration is complete on that portion, the restoration process may continue to the other portions.

Figure 8:
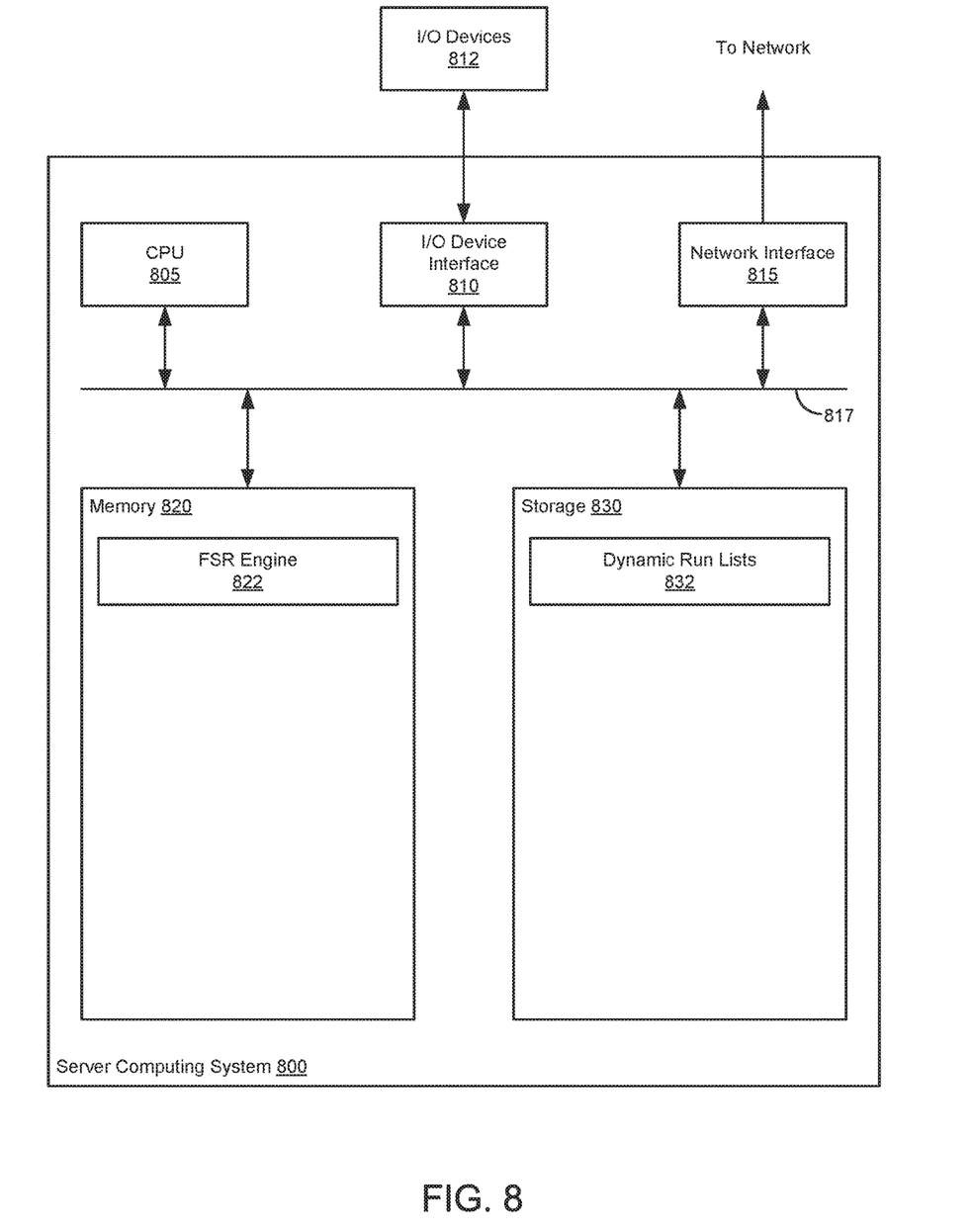
FIG. 8 illustrates an example computing system configured to restore application services after a large service disruption, according to one embodiment.

FIG. 8 illustrates an example server computing system 800 configured to restore application services following a mass outage to a computer network (e.g., an enterprise network), according to an embodiment. As shown, the server computing system includes, without limitation, a central processing unit (CPU) 805, an I/O device interface 810, which may allow for the connection of various I/O devices 812 (e.g., keyboards, displays, mouse devices, pen input, etc.) to the system 800, network interface 815, a memory 820, storage 830, and an interconnect 817.

CPU 805 may retrieve and execute programming instructions stored in the memory 820. Similarly, the CPU 805 may retrieve and store application data residing in the memory 820. The interconnect 817 transmits programming instructions and application data, among the CPU 805, I/O device interface 810, network interface 815, memory 820, and storage 830. CPU 805 is included to be representative of a single CPU, multiple CPUs, a single CPU having multiple processing cores, and the like. Additionally, the memory 820 is included to be representative of a random access memory. Furthermore, the storage 830 may be a solid state or disk drive. Although shown as a single unit, the storage 830 may be a combination of fixed and/or removable storage devices, such as fixed disc drives, removable memory cards or optical storage, network attached storage (NAS), or a storage area-network (SAN). In some cases, system 800 may be a single physical system or a distributed system, such as in one or more computer systems or data centers, with processing capabilities, memory 820, and storage 830 distributed across multiple computer systems.

As shown, memory 820 includes a faster service restoration (FSR) engine 822. In one embodiment, the FSR engine 822 dynamically profiles application services that are down as a result of a large service disruption (e.g., due to system failure, network device failure, or other failures relating to application service components). For example, the FSR engine 822 may identify server hosts, based on a host inventory, that execute services associated with the application. Further, the FSR engine 822 may identify dependency chains associated with each service. Doing so allows the FSR engine to 822 determine appropriate healing scripts for restoring the services, tailored to the identified hosts, clusters, and dependency chains.

In one embodiment, the FSR engine 822 generates dynamic run lists 832 for restoring each of the application services that are unavailable as a result of the mass outage. A dynamic run list 832 provides a superset of host inventories and healing scripts used to restore one or more application services in the enterprise network. In addition, the dynamic run list 832 includes other instructions for how the scripts should be executed on target host servers. For example, the dynamic run list 832 may specify whether a script should be executed in parallel to the restoration of another service or serial.

In one embodiment, the FSR engine 822 may push the dynamic run lists 832 to target servers for execution. The FSR engine 822 may then establish a secure connection, e.g., using SSH, with the target servers. Doing so allows the FSR engine 822 to execute, via the secure connection, the instructions and scripts provided by the generated dynamic run list 832. As a result, the FSR engine 822 restores application services affected by the service disruption.

In the preceding, reference is made to embodiments of the present disclosure. However, the present disclosure is not limited to specific described embodiments. Instead, any combination of the following features and elements, whether related to different embodiments or not, is contemplated to implement and practice the techniques presented herein.

Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects presented herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures.

For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments presented herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for restoring a plurality of services of an application in a computer network following a service disruption, the method comprising:
  identifying, via a processor, one or more servers hosting at least one of the services;
  identifying at least a first dependency between the at least one of the services and another one of the plurality of services;
  generating a run list comprising one or more scripts for restoring the plurality of services in one or more successive phases, wherein each successive phase is determined based on the at least a first dependency, wherein each script is associated with one of the plurality of services and comprises instructions for one of starting, stopping, or restarting the service; and
  based on the run list:
    saving data of a downstream dependent service in a temporary restoration directory, wherein the downstream dependent service depends on the at least one of the services;
    stopping the downstream dependent service;
    restarting the at least one of the services;
    restarting the downstream dependent service; and
    loading the data of the downstream dependent service saved in the temporary restoration directory into the downstream dependent service.

2. The method of claim 1, wherein each successive phase includes a service of the plurality of services that has a dependency on a service associated with a previous phase in the one or more successive phases.

3. The method of claim 1, further comprising:
  establishing a secure connection with at least a first server in the one or more servers; and
  executing, via the secure connection, the run list on the first server to restore at least a first service of the plurality of services.

4. The method of claim 3, further comprising:
  upon determining that the first service was not restored successfully, generating an error notification; and
  presenting the error notification.

5. The method of claim 1, wherein the run list further comprises instructions for carrying out the scripts in parallel or serially with at least a first server in the one or more servers.

6. The method of claim 1, further comprising: identifying a cluster topology including at least one of the one or more servers that executes the at least one of the services.

7. The method of claim 1, further comprising, prior to identifying the one or more servers hosting at least one of the services:
  receiving an indication to restore the plurality of services of the application; and
  determining whether the plurality of services is unavailable.

8. A non-transitory computer-readable storage medium storing instructions, which, when executed by a processor, performs an operation for restoring a plurality of services of an application in a computer network following a service disruption, the operation comprising:
  identifying, via the processor, one or more servers hosting at least one of the services;
  identifying at least a first dependency between the at least one of the services and another one of the plurality of services;
  generating a run list comprising one or more scripts for restoring the plurality of services in one or more successive phases, wherein each successive phase is determined based on the at least a first dependency, wherein each script is associated with one of the plurality of services and comprises instructions for one of starting, stopping, or restarting the service;
  based on the run list:
    saving data off a downstream dependent service in a temporary restoration directory, wherein the downstream dependent service depends on the at least one of the services;
    stopping the downstream dependent service;
    restarting the at least one of the services;
    restarting the downstream dependent service; and
    loading the data of the downstream dependent service saved in the temporary restoration directory into the downstream dependent service.

9. The non-transitory computer-readable storage medium of claim 8, wherein each successive phase includes a service of the plurality of services that has a dependency on a service associated with a previous phase in the one or more successive phases.

10. The non-transitory computer-readable storage medium of claim 8, wherein the operation further comprises:
  establishing a secure connection with at least a first server in the one or more servers; and
  executing, via the secure connection, the run list on the first server to restore at least a first service of the plurality of services.

11. The non-transitory computer-readable storage medium of claim 10, wherein the operation further comprises:

upon determining that the first service was not restored successfully, generating an error notification; and presenting the error notification.

12. The non-transitory computer-readable storage medium of claim 8, wherein the run list further comprises instructions for carrying out the scripts in parallel or serially with at least a first server in the one or more servers.

13. The non-transitory computer-readable storage medium of claim 8, wherein the operation further comprises: identifying a cluster topology including at least one of the one or more servers that executes the at least one of the services.

14. The non-transitory computer-readable storage medium of claim 8, wherein the operation further comprises, prior to identifying the one or more servers hosting at least one of the services:

receiving an indication to restore the plurality of services of the application; and determining whether the plurality of services is unavailable.

15. A system, comprising:

a processor; and a memory storing instructions, which, when executed by the processor, perform an operation for restoring a plurality of services of an application in a computer network following a service disruption, the operation comprising:

identifying one or more servers hosting at least one of the services;

identifying at least a first dependency between the at least one of the services and another one of the plurality of services;

generating a run list comprising one or more scripts for restoring the plurality of services in one or more successive phases, wherein each successive phase is determined based on the at least a first dependency, wherein each script is associated with one of the plurality of services and comprises instructions for one of starting, stopping, pr restarting the service;

based on the run list:

saving data of a downstream dependent service in a temporary restoration director, wherein the downstream dependent service depends on the at least one of the service;

stopping the downstream dependent service;

restarting the at least one of the services;

restarting the downstream dependent service; and loading the data of the downstream dependent service saved in the temporary restoration directory into the downstream dependent service.

16. The system of claim 15, wherein each successive phase includes a service of the plurality of services that has a dependency on a service associated with a previous phase in the one or more successive phases.

17. The system of claim 15, wherein the operation further comprises:

establishing a secure connection with at least a first server in the one or more servers; and executing, via the secure connection, the run list on the first server to restore at least a first service of the plurality of services.

18. The system of claim 17, wherein the operation further comprises:

upon determining that the first service was not restored successfully, generating an error notification; and presenting the error notification.

19. The system of claim 15, wherein the run list further comprises instructions for carrying out the scripts in parallel or serially with at least a first server in the one or more servers.

20. The system of claim 15, wherein the operation further comprises, prior to identifying the one or more servers hosting at least one of the services:

receiving an indication to restore the plurality of services of the application; and determining whether the plurality of services is unavailable.

* * * * *